United States Patent Office 2,870,228
Patented Jan. 20, 1959

2,870,228

DEHYDROGENATION OF HYDROCARBONS

Warren E. Armstrong, Lafayette, and Carroll Z. Morgan, Alameda, Calif., assignors to Shell Development Company, New York, N. Y., a corporation of Delaware No Drawing. Application December 24, 1956
Serial No. 630,076

14 Claims. (Cl. 260—669)

This invention relates to an improved process for the catalytic dehydrogenation of hydrocarbons and to an improved modified iron oxide catalyst therefor.

For several years selective catalytic dehydrogenation has been of great importance in changing the hydrocarbons obtained from naturally-occurring raw materials, such as petroleum, natural gas and coal to a form which may be more directly utilized by the chemical process and manufacturing industries. For example, with this type of reaction, olefins and diolefins may be produced from more saturated compounds obtained from the raw materials and may then be used directly in various processes, e. g. the production of synthetic rubber and resins by polymerization.

Two of the more important of these reactions are the dehydrogenation of n-butenes to butadiene which may then be polymerized with various co-monomers, e. g. styrene, acrylonitrile, and isobutylene to produce a variety of synthetic rubbers, and the dehydrogenation of ethyl benzene to styrene which besides being used with butadiene to produce synthetic rubber may be homopolymerized to produce polystyrene, one of the most widely used synthetic resins. Styrene also may be polymerized with a wide variety of co-monomers other than butadiene to yield resins having various properties and uses. This type of dehydrogenation reaction is favored by low partial pressures of the hydrocarbon reactant. The process is usually carried out using a mixture of said reactant and a relatively large proportion of steam, e. g. 2-30 mols of steam per mol of hydrocarbon.

The catalysts used in any of these processes is usually at least one metal, more often a mixture of metals of groups IV to VIII of the periodic table either in their free form or in the form of various of their compounds, e. g. the oxides, sulfides or phosphates. The use of many of these catalysts, however, is limited by various disadvantages, e. g. low conversions, and/or selectivities of reaction, short catalyst life, necessity for frequent regeneration, a possibility of being poisoned by the steam diluent and in the case of some phosphate catalysts, a tendency toward "wildness," i. e. the sudden catalyzation of reactions resulting in the formation of large quantities of undesired products.

A class of catalyst which has been found to have a minimum of these disadvantages is that based on potassium-promoted iron oxide. A small amount of another heavy metal oxide more difficultly reducible than iron oxide is often incorporated in these catalysts to improve the stability of the iron oxide. One of the major advantages of these catalysts is that they are auto-regenerative under conditions at which many dehydrogenation reactions are carried out, e. g. temperatures of 580–700° C. and in the presence of steam, that is, they have the property of being continually regenerated under the conditions of reaction. This obviates the necessity for interrupting the process and regenerating the catalysts, such regeneration including the burning of the carbon deposits off the surface of the catalyst particles, which is necessary with other dehydrogenation catalysts. However, although the advantages of these catalysts cause them to be widely used in the production of butadiene from n-butenes and styrene from ethyl benzene, they suffer the disadvantage of catalyzing the reaction, especially the dehydrogenation of n-butenes to butadiene in a manner such that the mol percent selectivity of reaction (mols of desired product per mol of reactant reacted) varies inversely with the rate of conversion (percent reactant reacted) thus necessitating running the process at fairly low rates of conversion (under 35%) so as to obtain an economically feasible amount of desired product from the feed. Since the practicality of a given dehydrogenation process often depends on a relatively narrow margin of production, any change in the composition or method of production of the catalyst which would result in an increase in the selectivity of reaction at various conversion rates is greatly to be desired.

It is an object of this invention to provide an improved process for the dehydrogenation of hydrocarbons whereby improved mol percent selectivities of reaction at various rates of conversion are obtained. More specifically, it is an object of this invention to provide a process of dehydrogenating hydrocarbons, e. g. n-butenes to butadiene and ethyl benzene to styrene utilizing a new class of catalysts based on potassium-promoted iron oxide whereby improved mol percent selectivities at various rates of conversions are obtained.

These objectives are achieved by carrying out the dehydrogenation reaction in the presence of an iron oxide catalyst of the type previously described in which a small amount of a phosphate within a certain range of proportions is incorporated. The finished catalyst composition contains at least about 35% of an iron oxide having a degree of oxidation from $Fe_3O_4$ to $Fe_2O_3$, the total calculated as $Fe_2O_3$, at least one potassium compound (other than the chloride) which is at least partially convertible to potassium carbonate under the dehydrogenation conditions of this invention, i. e. in the presence of a small amount of $CO_2$ and at a temperature over 580° C. in an amount equivalent to at least 6% of $K_2O$ and 0.5 to 20% of a potassium phosphate or an amount of another compound which yields an equivalent quantity of phosphate radicals under the conditions of reaction, the percentages being based on the weight of the total catalyst (with K computed as $K_2O$ and including the phosphate). The catalyst may also contain at least 0.5% of a heavy metal oxide more difficultly reducible than $Fe_2O_3$ although such oxide is not necessary in all cases. Preferred ranges of components are 55–85% of $Fe_2O_3$, 1–4% of the other heavy metal oxide if it is used, 8–30% of potassium compound calculated as $K_2O$, and 3–15% of $K_3PO_4$ or equivalent.

The foregoing proportions are given with the amount of iron oxide computed as $Fe_2O_3$ for convenience. However, there are indications that under the conditions of reaction the $Fe_2O_3$ is reduced to an oxide closer to the formula of magnetite, i. e., $Fe_3O_4$. In any case either of these forms of oxide or one having a degree of oxidation in the aggregate intermediate the two may be used in the preparation of the catalysts.

Although the heavy metal oxide more difficultly reducible than that of iron is not absolutely necessary in preparing active catalysts, its presence is often beneficial to the stability of the iron oxide. Some of the oxides more difficultly reducible than that of iron which may be used in the preparation of catalysts according to this invention are those of various heavy metals forming more than one oxide, e. g. the oxides of chromium, manganese, bismuth, tungsten, molybdenum, and cerium. However, a chromium oxide is preferred.

The potassium compound other than the phosphate used in the preparation of the catalysts is preferably potassium carbonate. However, any compound other than the chloride which is at least partially convertible to the carbonate under conditions of reaction may be used. Examples of some of these compounds are the hydroxide, nitrate, bicarbonate, sulfate and acetate.

The phosphate may be incorporated in any form which yields phosphate radicals under conditions of reaction, e. g. as an alkali metal or alkaline earth phosphate, or as phosphoric acid or phosphorus pentoxide. However, in view of the superior promoting activity of potassium in the type of catalyst contemplated, a potassium phosphate, e. g. tripotassium or secondary potassium phosphate is preferred.

The method of preparation of the catalysts is not critical. For example, the separate components may be ball-milled or otherwise mixed with a small amount of water formed into pellets and dried, or catalysts may be prepared by means of a co-precipitation of solutions of reagents wherein the precipitate is convertible to the desired components of the catalysts or by impregnating the iron oxide with the other components. Also uncritical are the shape and size of the catalyst particles. For example, the catalyst may be in the form of pellets, powder, pills, spheres, saddles, etc. Cylindrical pellets of $\frac{1}{16}$ to $\frac{3}{4}$ inch diameter and $\frac{1}{16}$ to 1 inch length are considered very satisfactory. It has been found that a calcination of the iron oxide, either prior or subsequent to mixing with the other components for at least one hour and preferably several hours at a temperature of 550–1050° C. is usually beneficial to the activity of the catalyst.

The preparation of the catalyst is illustrated by the following example:

Example

A catalyst was prepared by thoroughly mixing 333 g. of $Fe_2O_3$, 11.7 g. $Cr_2O_3$, 150 g. of $K_2CO_3$, 40 g. of $K_3PO_4$ and sufficient water to produce on extrudable powder. The composition was then extruded into $\frac{1}{8}$ inch pellets which were dried at 110–120° C. and calcined for three hours at 600° C. This catalyst contained on the basis of initial compounds used in the preparation 62.3% $Fe_2O_3$, 2.2% $Cr_2O_3$, potassium compounds mostly as the carbonate equivalent to 22.4% $K_2O$ and 7.5% $K_3PO_4$ with the remainder as $CO_2$ in the carbonate. The percent $K_2O$ includes the potassium in both the $K_2CO_3$ and $K_3PO_4$. Other catalysts were similarly prepared from mixes containing the same amounts of $Fe_2O_3$ and $Cr_2O_3$ as above but with the $K_2CO_3$ and $K_3PO_4$ varied so as to yield catalysts containing a constant amount of potassium in the form of $K_2O$, and varying percentages of $K_3PO_4$ between 2.2 and 26.9%. A control catalyst containing the same amounts of components as the other catalysts but with no $K_3PO_4$ was also prepared.

To illustrate the superiority of the phosphate-modified iron oxide catalysts of this invention, the activities of the catalysts prepared according to the above example in the dehydrogenation of n-butene-2 to butadiene were determined. The butene was passed with steam through a tubular reactor having a 1″ I. D. and a catalyst volume of 50 cc. at a gas hourly space velocity of 500, a steam to butene ratio of 12 and temperatures between 620 and 660° C. The selectivities for butadiene obtained with the various catalysts at 35% conversion are summarized in the following table:

| Percent w. $K_3PO_4$ | Selectivity for Butadiene at 30% Conversion of n-Butene-2 |
| --- | --- |
| 0 | 75.9 |
| 2.2 | 77.7 |
| 4.6 | 80.0 |
| 7.5 | 80.2 |
| 9.0 | 80.2 |
| 26.9 | 73.0 |

These values were obtained by running the reaction at 620, 640 and 660° C. with each catalyst and analyzing the resulting product. The rate of conversion obtained at each temperature was plotted against the mol percent selectivity and the resulting curve was used to obtain the selectivity at 35% conversion.

The results show a significant improvement obtained with the specific catalysts having between 2.2 and 9.0% tripotassium phosphate with a sharp decline in selectivity at 26.9%. As stated previously, however, the potassium phosphate may be as low as 0.5% or as high as 20% of the total catalyst which is equivalent to about 0.2 to about 9% by weight of phosphate radicals or of one-third those amounts of phosphorus, as phosphate.

Since greater amounts of the desired product at any given degree of conversion are obtained with the catalyst of this invention, a dehydrogenation process may be run at lower conversions than present so as to obtain the same amount of the desired products, but with the production of a smaller amount of undesired compounds, or at similar conversions to obtain a greater amount of desired product from the reaction. This improvement which is shown with the catalysts of this invention in the dehydrogenation of hydrocarbons in terms of percent yield or rate of production from a given supply of raw materials, or a combination of both factors, is very significant over a period of time in view of the demand for products such as butadiene and styrene.

We claim as our invention:

1. A process for the dehydrogenation of a hydrocarbon selected from the group consisting of n-butylene and ethyl benzene which comprises contacting said hydrocarbon in the presence of 2–30 mols of steam per mol of hydrocarbon under dehydrogenation conditions with a catalyst consisting of at least 35% of an iron oxide having a degree of oxidation from $Fe_3O_4$ to $Fe_2O_3$, the total oxide calculated as $Fe_2O_3$, potassium carbonate in an amount equivalent to at least 6% of $K_2O$, 0.2 to 9% of phosphate radicals as a phosphate of a metal selected from the group consisting of alkali metals and alkaline earth metals, and any remainder consisting of an oxide of a heavy metal selected from the group consisting of Cr, Mn, Bi, W, Mo and Ce, the percentages being by weight of the total of the recited components of the catalyst.

2. The process of claim 1 wherein the dehydrogenation is of n-butenes to butadiene.

3. The process of claim 1 wherein the dehydrogenation is of ethyl benzene to styrene.

4. The process of claim 1 wherein the catalyst contains at least 0.5% of the said heavy metal oxide.

5. The process of claim 4 wherein the catalyst comprises 55–85% of the iron oxide calculated as $Fe_2O_3$, 1–4% of a chromium oxide calculated as $Cr_2O_3$, potassium compounds comprising a major proportion of $K_2CO_3$ and in an amount equivalent to 8–30% of $K_2O$, and 3–15% of $K_3PO_4$.

6. The process of claim 5 wherein the dehydrogenation is of n-butenes to butadienes.

7. The process of claim 5 wherein the dehydrogenation is of ethyl benzene to styrene.

8. The process of claim 1 wherein the catalyst is calcined for at least one hour at 550–1050° C. prior to being contacted with the hydrocarbon.

9. The process of claim 5 wherein the catalyst is calcined for at least one hour at 550–1050° C. prior to being contacted with the hydrocarbon.

10. A new dehydrogenation catalyst consisting of at least 35% of an iron oxide having a degree of oxidation from $Fe_3O_4$ to $Fe_2O_3$, the total calculated as $Fe_2O_3$, potassium carbonate in an amount equivalent to at least 6% of $K_2O$, between 0.2 and 9% phosphate radicals in the form of a phosphate of a metal selected from the group consisting of alkali metals and alkaline earth metals, and any remainder consisting of an oxide of a heavy metal selected from the group consisting of Cr, Mn, Bi, W, Mo and Ce, the percentages being by weight of the total recited components.

11. A catalyst of claim 10 which has been calcined for at least one hour at 550–1050° C.

12. A catalyst of claim 10 which contains at least 0.5% of a heavy metal oxide more difficultly reducible than $Fe_2O_3$.

13. A new dehydrogenation catalyst comprising 55–85% of an iron oxide having a degree of oxidation from $Fe_3O_4$ to $Fe_2O_3$, calculated as $Fe_2O_3$, 1–4% of chromium oxide calculated as $Cr_2O_3$, potassium carbonate in an amount equivalent to 8–30% of $K_2O$, and 3–15% of $K_3PO_4$, the percentages being by weight of the total recited components.

14. A catalyst of claim 13 which has been calcined for at least one hour at 550–1050° C.

References Cited in the file of this patent

UNITED STATES PATENTS

| | | |
|---|---|---|
| 2,461,147 | Davies et al. | Feb. 8, 1949 |
| 2,641,619 | Noddings et al. | June 9, 1953 |
| 2,666,086 | Pitzer | Jan. 12, 1954 |